United States Patent
Fabian

(10) Patent No.: US 7,617,983 B1
(45) Date of Patent: Nov. 17, 2009

(54) METHODS AND APPARATUS FOR DYNAMIC ADJUSTMENT OF SCANNER PARAMETERS

(75) Inventor: Kenneth Joseph Fabian, Grayson, GA (US)

(73) Assignee: NCR Corporation, Dayton, OH (US)

( * ) Notice: Subject to any disclaimer, the term of this patent is extended or adjusted under 35 U.S.C. 154(b) by 578 days.

(21) Appl. No.: 11/021,798

(22) Filed: Dec. 23, 2004

(51) Int. Cl.
*G02B 26/00* (2006.01)
(52) U.S. Cl. .............. 235/462.4; 235/454; 235/462.01; 235/462.32
(58) Field of Classification Search . 235/462.37–462.4, 235/454, 462.01, 462.08, 462.25, 462.32, 235/462.45, 472.01
See application file for complete search history.

(56) References Cited

U.S. PATENT DOCUMENTS

| | | | | | |
|---|---|---|---|---|---|
| 4,932,732 | A | * | 6/1990 | Nakajima | 359/210.1 |
| 5,039,184 | A | * | 8/1991 | Murakawa et al. | 359/216 |
| 5,484,990 | A | * | 1/1996 | Lindacher et al. | 235/462.22 |
| 5,530,579 | A | * | 6/1996 | Nakamura et al. | 359/216 |
| 5,532,866 | A | * | 7/1996 | Shibata et al. | 359/216 |
| 5,574,592 | A | * | 11/1996 | Sano et al. | 359/211 |
| 6,003,772 | A | * | 12/1999 | Dickson et al. | 235/462.01 |
| 6,032,865 | A | * | 3/2000 | Itoh et al. | 235/462.25 |
| 6,053,409 | A | * | 4/2000 | Brobst et al. | 235/462.36 |
| 6,199,759 | B1 | * | 3/2001 | Dickson et al. | 235/472.01 |
| 6,237,851 | B1 | * | 5/2001 | Detwiler | 235/462.38 |
| 6,454,169 | B1 | * | 9/2002 | Belknap et al. | 235/462.4 |
| 6,651,889 | B2 | * | 11/2003 | Belknap et al. | 235/462.4 |
| 6,796,503 | B1 | * | 9/2004 | Fabian et al. | 235/462.01 |
| 6,827,271 | B2 | * | 12/2004 | Lindacher | 235/462.4 |

* cited by examiner

*Primary Examiner*—Seung H Lee
(74) *Attorney, Agent, or Firm*—Priest & Goldstein, PLLC; Harden E. Stevens, III

(57) ABSTRACT

Systems and techniques for improved accuracy of bar code detection and decoding are described. A bar code scanner employs a rotating spinner to reflect a laser beam used to produce one or more scan patterns emerging from scan windows. The spinner has reflective surfaces, with one or more of the surfaces exhibiting variations influencing characteristics of the laser beam as it is reflected from the surfaces. The scanner produces a scanner signal in response to light entering the scan windows, and processes the scanner signal to detect and decode bar codes within a scan field of the scanner. The rotational position of the spinner is continuously monitored and adjustments to processing parameters are made and other actions are taken based on the rotational position of the spinner, in order to compensate for variations in the scan pattern caused by the variations in the surfaces of the spinner.

14 Claims, 4 Drawing Sheets

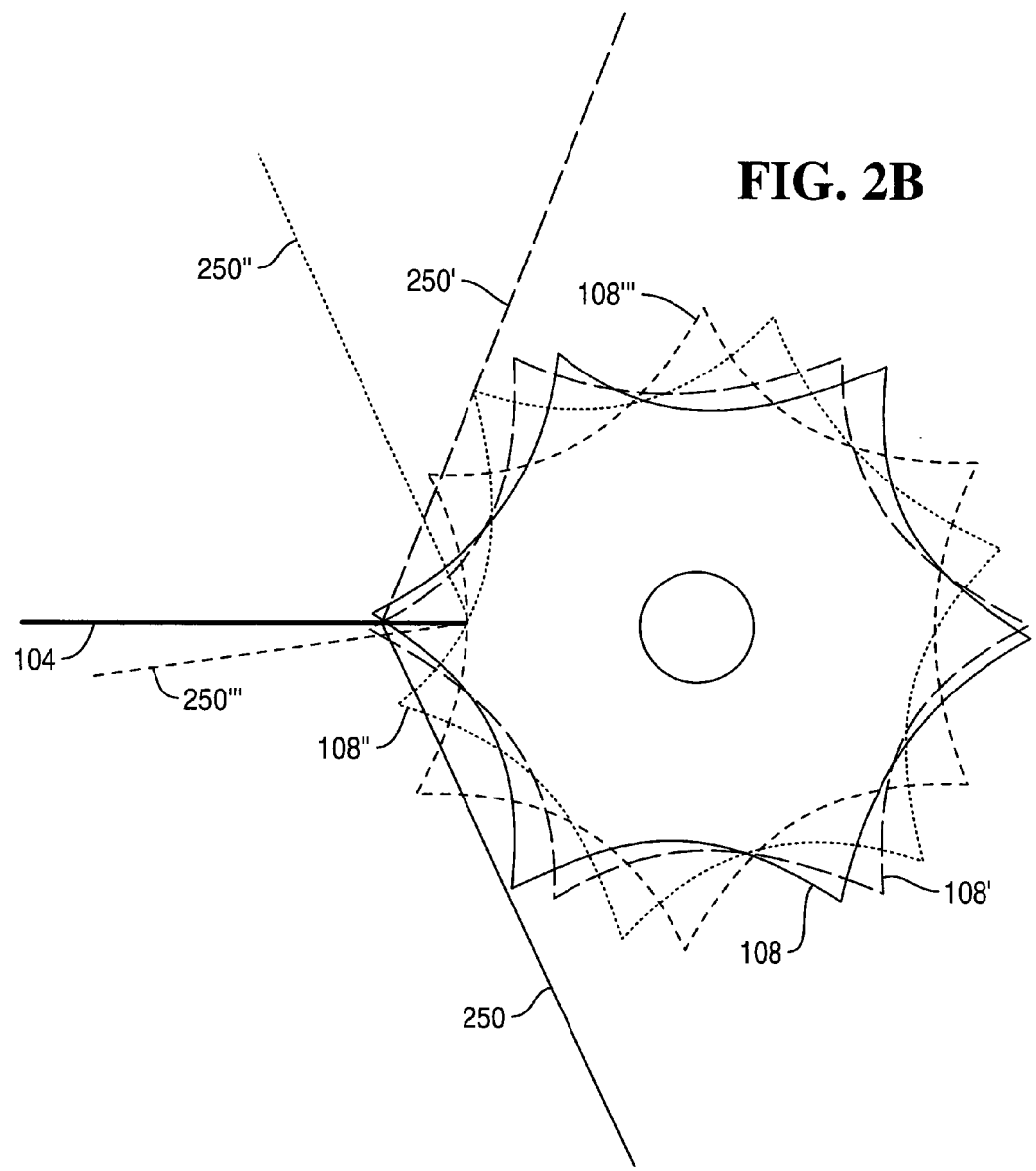

METHODS AND APPARATUS FOR DYNAMIC ADJUSTMENT OF SCANNER PARAMETERS

FIELD OF THE INVENTION

The present invention relates generally to improvements in bar code scanners. More particularly, the invention relates to an improved spinner for use in a scanner and for improved techniques for automatic adjustment of scanner parameters in order to adapt to variations in the light pattern caused by variations exhibited by a rotating spinner.

BACKGROUND OF THE INVENTION

Bar code scanners are widely used in numerous applications in which bar codes are employed to track goods and to track and facilitate transactions involving goods. Speed and accuracy in scanning is always highly desirable, and producing a scan pattern that provides the greatest possible coverage contributes significantly to speed and accuracy. One significant contributor to the coverage provided by a scan pattern is the number of scan lines comprising the scan pattern. For example, a scan beam is produced when a laser beam strikes a rotating polygonal spinner and is directed to a scan window, typically by a series of fixed mirrors. The scan beam emerges from a scanner window. The rotation of the spinner causes the scan beam to sweep out a scan line. As the spinner rotates, the laser beam is deflected by succeeding facets of the polygon, producing a plurality of scan lines to form a scan pattern.

One major limitation constraining the number of scan lines in a scan pattern is the number of facets that the polygonal spinner may have. Most prior art scanners use spinners whose facets are as flat as possible in order to reduce distortion in the laser spot and to maximize the efficiency of collection of light that is directed back into the scanner as a result of a reflection created when a scan pattern strikes a bar code. If the facets of the spinner are flat, adding additional flat facets to the spinner reduces the angles between adjacent facets and reduces the angles at which different scan lines are oriented with respect to one another, thereby limiting the coverage produced by the scan pattern. A smaller angle between scan lines leads to a higher tendency toward overlap of the area covered by the scan lines.

A spinner may be designed to have concave facets, allowing for an increased number of facets and also for a relatively great angle between facets. However, the use of a spinner having concave facets creates a number of problems. One problem is that the speed at which the scan beam sweeps out a scan line, and, therefore, the speed at which the scan beam travels across an object being scanned, will vary significantly if the spinner rotates at a fixed speed, causing timing variations in the timing of light reflected from a bar code. The other problem is that the intensity of light on an object being scanned, and therefore the intensity of light reflected back into the scanner, decreases when the laser beam striking the spinner is near an edge separating two facets of the spinner. If accommodations are not made for such variations in timing and light intensity, the variations may interfere with accurate scanning.

There exists, therefore, a need for a scanner that can produce a scan pattern with a relatively large number of scan lines oriented at relatively large angles with respect to one another, and which can adapt to any variations in light and pattern characteristics caused by features of a reflective spinner used by the scanner to create the scan pattern.

SUMMARY OF THE INVENTION

A scanner designed according to one aspect of the present invention may suitably include a polygonal spinner with surfaces whose characteristics vary along their extent. For example concave surfaces that exhibit a changing angle may be employed. The variations of the spinner surfaces cause variations in conditions affecting scanning, such as the intensity of the laser beam reflected from the spinner and the speed at which a scan beam sweeps out a scan line. Therefore, the scanner takes advantage of available information relating to the rotational position of the spinner, and uses this information in setting scanner parameters in order to make adjustments for the variations in the spinner surfaces. If the position of the spinner at a particular time is known, the shape of the portion of the spinner being struck by the laser beam and its effect on the angular speed of the scan beam, the intensity of the scan beam and other conditions affecting scanning, can be calculated. The required calculations are performed by taking into account the known characteristics of the spinner, such as the degree of concavity of the spinner surfaces. Other factors may be taken into account as well, such as the various placements and orientations of elements within the scanner, the properties of the laser beam used to produce the scan pattern and the optical properties and other characteristics of elements affecting the generation of the scan pattern.

The position of the spinner may suitably be determined using any of a number of techniques. For example, a Hall sensor may be implemented with a spinner motor, producing signals indicating the angular position of the spinner motor and thus of the spinner. Alternatively, the spinner position may be optically calibrated at various intervals, and a timer used to compute the angular position of the spinner. If the spinner rotates at a known speed, the position of the spinner can be calculated using the time elapsed since the spinner was in a known position. Other techniques for determining the angle of rotation of the spinner may be employed, and any technique providing sufficiently accurate information about the rotation angle may be used.

A more complete understanding of the present invention, as well as further features and advantages of the invention, will be apparent from the following Detailed Description and the accompanying drawings.

BRIEF DESCRIPTION OF THE DRAWINGS

FIG. 2B illustrates a six faceted concave faceted spinner in various rotational positions and reflected laser beams reflected from the spinner.

DETAILED DESCRIPTION

Figure 1:
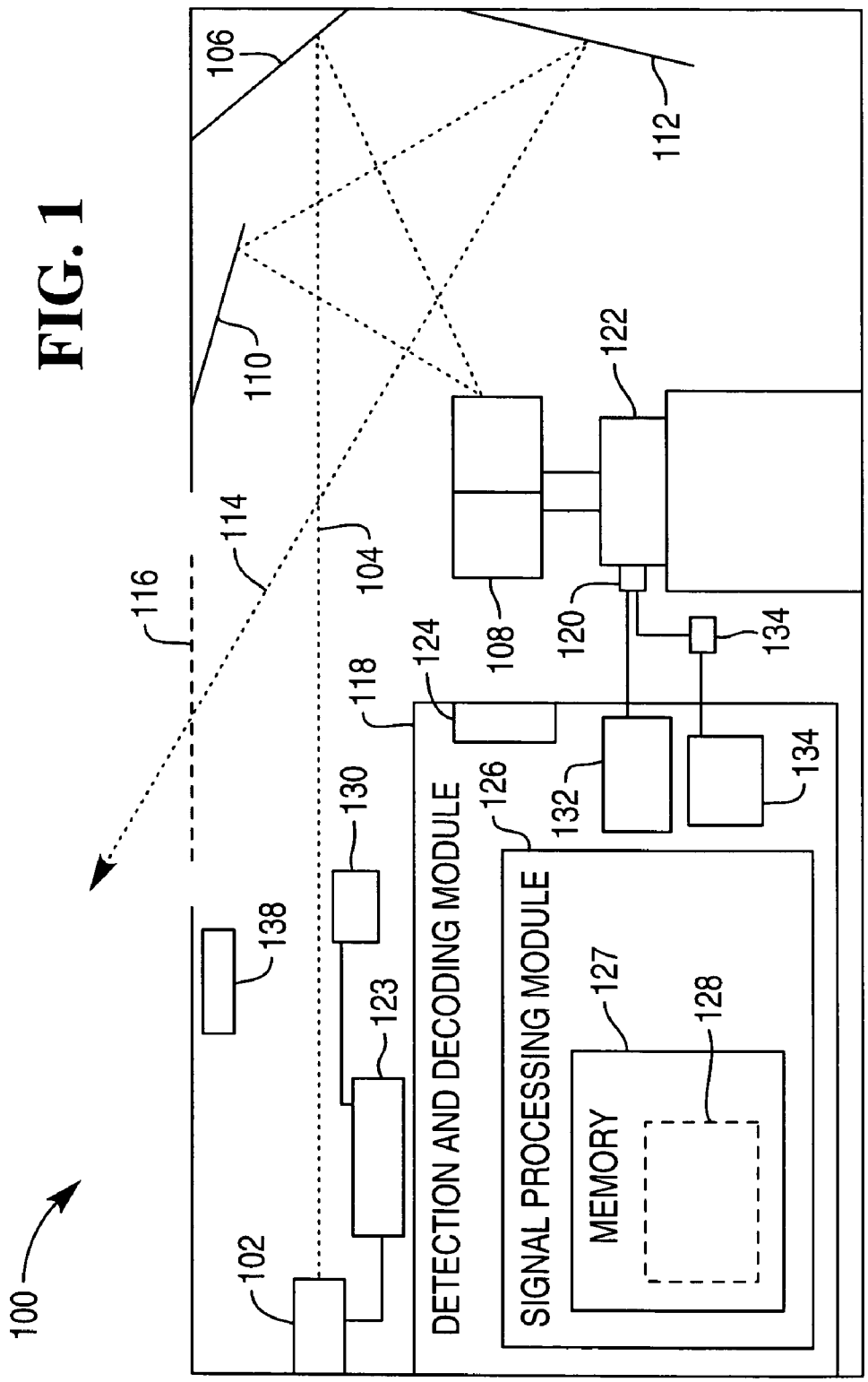
FIG. 1 illustrates a scanner according to an aspect of the present invention.
Figure 2A:
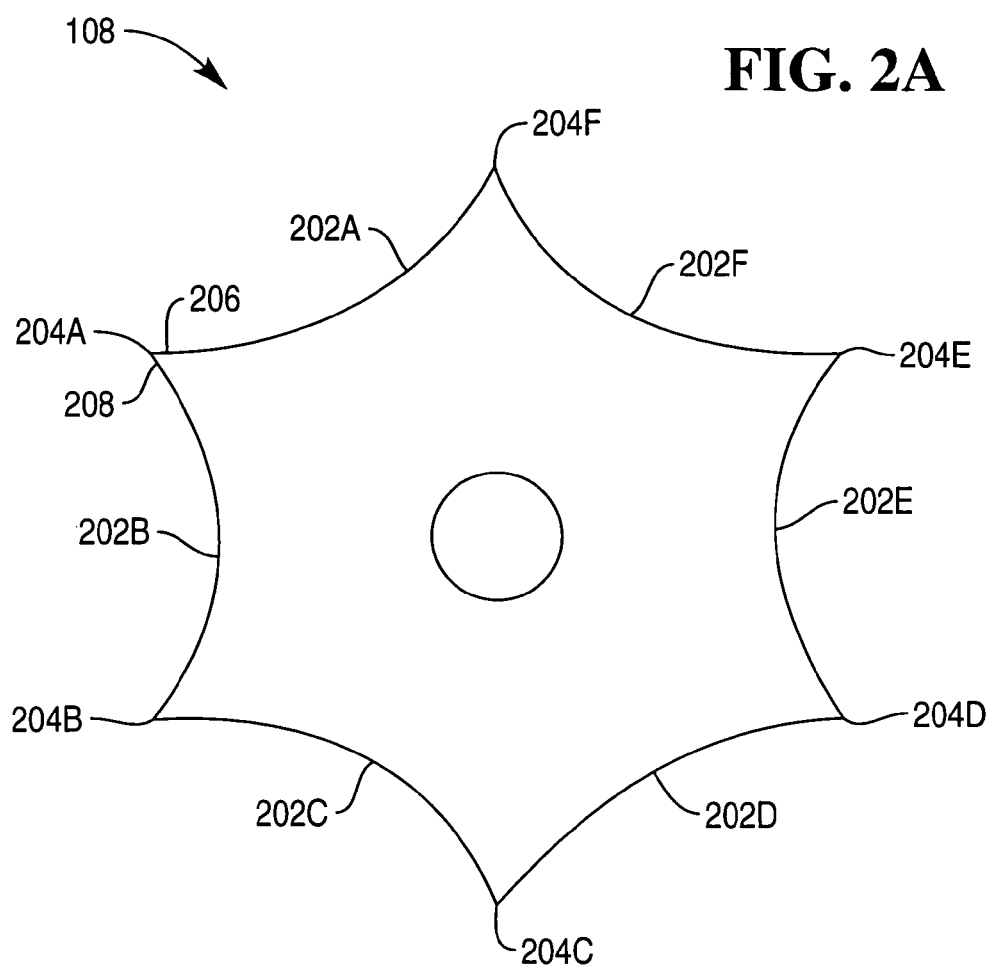
FIG. 2A illustrates a six faceted spinner having concave facets, advantageously used in a scanner according to an aspect of the present invention.

FIG. 1 illustrates an exemplary scanner 100 according to one aspect of the present invention. The scanner 100 includes a laser 102 emitting a laser beam 104. The laser beam 104 is directed to a deflector mirror 106 and is reflected to strike a rotating polygonal spinner 108. The spinner 108 has facets that exhibit variations along their extent. By way of example, the spinner 108 illustrated here is a six faceted spinner having concave facets, as best seen in FIGS. 2A and 2B, but it will be recognized that the techniques of the present invention may be applied to any of a wide variety of spinner designs. Construction of the spinner 108 so that the facets of the spinner 108 are concave allows for a relatively large angle between facets of the spinner 108, allowing for a relatively large angle between scan lines produced by scan beams reflected from adjacent facets of the spinner 108.

The scanner 100 also includes a set of primary mirrors of which a primary mirror 110 is illustrated here, as well as a set of secondary mirrors of which a secondary mirror 112 is illustrated here. Once the laser beam 104 is reflected from the spinner 108, it is directed to one of the primary mirrors and from there to one of the secondary mirrors. Here, the laser beam 104 is shown as traveling from the spinner 108 to the primary mirror 110 and then to the secondary mirror 112. Once the laser beam 104 is reflected from a secondary mirror, it is conveniently called a scan beam 114, and is directed to and out of a scan window 116. While only a single scan window 116 is shown here, it will be recognized that a scanner similar to the scanner 100 can easily be designed so as to have two or more scan windows. See, for example, U.S. Pat. No. 6,796,503, which is incorporated herein by reference in its entirety.

As the spinner 108 rotates, the angle of reflection of the laser beam 104 from the spinner 108 changes, causing the laser beam 104 and the scan beam 114 to move. The rotation of the spinner 108 causes the scan beam 114 to move across the scan window 116, causing it to trace out a scan line. In addition, the rotation of the spinner 108 and the change of the spinner facet from which the laser beam 104 is reflected causes the path traveled by the laser beam 104 to change, so that the laser beam 104 is reflected from different sets of primary and secondary mirrors, causing the position of the scan beam 114 to shift so that it traces out different scan lines. During each rotation of the spinner 108, a scan pattern emerges from the scan window 116, the scan pattern being created through the tracing out of a plurality of scan lines emerging from the scan window 116. When the scan pattern is reflected from a bar code, light reflected from the bar code enters the scan window 116 and is directed to a detecting and decoding module 118, which performs processing in order to decode the bar code.

During each rotation of the spinner 108, and notably during travel of the laser beam 104 along each concave facet of the spinner 108, the laser beam 104 reflected from the spinner 108 undergoes changes. For example, the angle of incidence at which the laser beam 104 is reflected from the spinner constantly changes. Therefore, the scan beam 114 emerging from the scan window 116 undergoes changes. These changes include changes in the angle at which the scan beam 114 emerges from the window 116. The changes also include changes in the speed at which the scan beam 114 travels across the scan window 116. The scan beam 114 travels more slowly when the laser beam is striking an area nearer the "trough" of the concavity of a facet of the spinner 108, which occurs when the facet is more nearly centered in the path of the laser beam 104. On the other hand, the scan beam 114 travels faster when the laser beam 104 is striking an area that is further away from the trough of the concavity. In addition, the intensity at which the scan beam 114 emerges from the scan window 116 varies with the position of the spinner 108. When the laser beam 104 is nearer an edge of the spinner 108, the intensity of light reflected from the spinner 108, and therefore of the scan beam 114, is reduced, provided that the intensity of the laser beam 104 is unchanged.

The changes to the intensity and speed of the scan beam 114 affect the detection and decoding of bar codes from which the scan beam 114 may be reflected. The change in speed of the scan beam 114 as a facet of the spinner 108 moves before the laser beam 104 causes changes in the timing of light that is received due to reflection from a bar code. In order to prevent these changes from interfering with proper decoding of bar codes, positional information relating to the position of the spinner 108 is used to adjust the operation of the detecting and decoding module 118, the laser 102 or the operation of both the detecting and decoding module 118 and the laser 102.

Positional information describing the position of the spinner 108 is provided by components of the scanner 100. This information is used to define adjustments to parameters used in detecting and decoding a barcode and to parameters affecting characterisitics of the scan beam 114, such as the intensity of the scan beam 114. Suitably, information relating to the angular position of the spinner 104 is received from a sensor, such as a Hall sensor 120, connected to a motor 122 used to rotate the spinner 108. The information from the Hall sensor 120 may be utilized to determine when the spinner 108 is in a predetermined reference position and then timing information may be used to determine the position of the spinner 108 throughout its rotation. If the spinner 108 has a known rate of rotation, the position of the spinner 108 can be determined by using the timing information to determine the displacement of the spinner 108 from the position indicated by the Hall sensor 120. If the Hall sensor 120 can indicate the position of the spinner 108 with sufficient precision, the information provided by the Hall sensor 120 can be used to determine the position of the spinner 108 throughout its rotation.

Alternative techniques may be used to determine when the spinner 108 is in a reference position. For example, a synchronization label may be read to determine a reference position of the spinner 108 and then timing information can be utilized to determine the displacement of the spinner from the reference position in a known manner. Further details of such use of a synchronization label are disclosed in U.S. Pat. No. 6,220,513 and U.S. Pat. No. 6,347,741, both of which are assigned to the assignee of the present invention and incorporated herein by reference in their entirety. Alternatively, a scanner may employ a diffractive element to diffract a laser beam reflected from a spinner such as the spinner 108 when the spinner is in a reference position, such that the diffracted beam strikes a reference position photodetector to produce a reference position photosignal used to calibrate the position of the spinner. Further details regarding such determination of a spinner position using a photosignal produced by a diffracted beam are disclosed in U.S. Pat. No. 6,454,169, assigned to the assignee of the present invention and incorporated herein by reference in its entirety.

Once the position of the spinner 108 is identified, the positional information may be used by a laser intensity adjustment circuit 123 in order to vary the intensity of the laser beam 104. The positional information may also be used to set parameters used in analyzing reflected light entering the scanner and processed to detect and decode a bar code.

The detection and decoding module 118 employs information relating to the position of the spinner 108, in order to compensate for variations in the reflected laser beam 104 and the scan beam 114, occurring during the rotation of the spinner 108. The module 118 includes a photodetector 124. The photodetector 124 produces an electrical signal, suitably referred to as a scanner signal, when struck by light. The scanner signal is processed by a signal processing module 126, in order to determine if the signal represents a reflection from a bar code and to extract bar code information from the signal.

The signal processing module 126 receives information indicating the rotational position of the spinner 108, in order to compensate for variations in the scanner signal caused by the rotation of the spinner 108. The intensity and speed of movement, for example, of the scan beam 114 may change due to changes in the rotational position of the spinner 108, and the changes in intensity and speed of movement will be reflected in the scanner signal.

When the scan beam 114 crosses a barcode, the beam 114 moves across the barcode, and transitions between light and dark areas of the barcode occur. When the scanner signal crosses above or below a threshold, a transition is detected. The timing between threshold crossings indicates the width of each light and dark area. In addition, the intensity of the scan beam 114 affects the amplitude of the scanner signal 126, and affects the proper detection of whether the scanner signal has crossed a threshold or not.

In order to properly detect transitions of the scan beam 114 between light and dark areas of a barcode and to properly identify the widths of the light and dark areas, the signal processing module 126 takes the position of the spinner 108 into account when analyzing the scanner signal. The signal processing module 126 sets a sampling rate appropriate for the speed at which the scan beam 114 is moving at any particular time. The signal processing module 126 may also set a gain for the sampling signal, depending on the intensity of the scan beam 114 as computed based on the rotational position of the spinner 108.

The characteristics of the scan beam 114 at each position of the spinner 108 can be determined from the design of the scanner 100, or by calibration of the scanner 100, and appropriate adjustments to gain, sampling rate and laser intensity can be calculated and stored.

One exemplary way to perform calibration of the scanner 108 is to place an object having uniform reflective characteristics, such as white target, over the scan window 116. The spinner 108 is then rotated at its normal speed and the laser 102 is modulated at a known frequency and duty cycle, for example a frequency of 1 MHz and a duty cycle of 50%. Reflections from the white target will cause the photodetector 124 to produce a photodetector signal. The reflections received at the photodetector 124 will exhibit a consistent frequency, but the duty cycle exhibited by the reflections will vary with the position of the spinner 108 in the same manner as would reflections produced by an actual bar code, and will cause the photodetector signal to vary with the position of the spinner in the same way that the signal would vary with position during scanning of an actual bar code. Data collected through this calibration can be used to produce values in order to adjust sampling rates, timing, laser power and other parameters.

Values used to adjust scanner parameters may suitably be stored in an adjustment table. The signal processing module 126 may advantageously include memory 127 for storing an adjustment table 128. By way of example, the adjustment table 128 may include an entry for each rotational position of the spinner 108 at which an adjustment should occur. Each entry includes the rotational position of the spinner 108, and a value or values to be set or other action to be taken when the specified spinner position is reached. A partial example of the entries which it may be desirable to store in the table 128 is shown below.

| ADJUSTMENT TABLE | | |
|---|---|---|
| ANGLE_COUNT[15:0] | ACTION | COMMENT |
| 0 | GAIN = 100%, LSR_PWR = 100%, SAMPLE_RATE = 100% | Edge of first polygon mirror (fast sample, high laser power gain) |
| 50 | GAIN = 98%, LSR_PWR = 98%, SAMPLE_RATE = 98% | |
| 100 | GAIN = 97%, LSR_PWR = 96%, SAMPLE_RATE = 97% | |
| 150 | GAIN = 94%, LSR_PWR = 92%, SAMPLE_RATE = 94% | |
| 200 | GAIN = 90%, LSR_PWR = 88%, SAMPLE_RATE = 90% | |
| 300 | GAIN = 84%, LSR_PWR = 88%, SAMPLE_RATE = 84% | |
| 400 | GAIN = 82%, LSR_PWR = 88%, SAMPLE_RATE = 82% | |
| 500 | GAIN = 80%, LSR_PWR = 86%, SAMPLE_RATE = 80% | Center of first polygon mirror |
| 600 | GAIN = 82%, LSR_PWR = 86%, SAMPLE_RATE = 82% | |
| 700 | GAIN = 84%, LSR_PWR = 88%, SAMPLE_RATE = 84% | |
| 800 | GAIN = 90%, LSR_PWR = 88%, SAMPLE_RATE = 90% | |
| 850 | GAIN = 94%, LSR_PWR = 88%, SAMPLE_RATE = 94% | |
| 900 | GAIN = 97%, LSR_PWR = 92%, SAMPLE_RATE = 97% | |
| 950 | GAIN = 100%, LSR_PWR = 92%, SAMPLE_RATE = 100% | Dead zone at mirror edge |
| 980 | GAIN = 100%, LSR_PWR = 96%, SAMPLE_RATE = 100% | Dead zone at mirror edge |
| 1000 | GAIN = 0, LSR_PWR = 100%, SAMPLE_RATE = 100% | |
| . . . | | |
| 5999 | End of Table | |

In order to avoid unnecessary detail and duplication, the example shown above employs a lower resolution than would be used in an actual table used in processing. An actual table for use as the table 128 might include thousands of entries, because the resolution used to describe the position of the spinner 108 could be very fine. In addition, entries are shown in the table below for only one scan line, but an actual table such as the table 128 would include entries for every scan line in all scan patterns used in a scanner such as the scanner 100.

The exemplary values shown here include a sequence of rotational positions, expressed in terms of six-thousandths of a complete revolution. The spinner 108 is a six faceted polygon and the rotational positions range from 0 to 999 for the first facet of the spinner 108, 1000 to 1999 for the second facet, and so on. Each rotational position listed in the table has a value or values to be set or other action to be taken in addition to or instead of setting a value. The values are expressed here in terms of percent of maximum.

As the spinner 108 rotates, the laser intensity adjustment circuit 123 and the signal processing module 126 receive rotational position information from the sensor 120. The signal processing module 126 monitors the rotational position of the spinner 108. As the spinner 108 reaches each rotational position included in the table 128, processing elements 130 and 132 employed by the laser intensity adjustment circuit 123 and the signal processing module 126, respectively, make the adjustments associated with that position of the spinner 108. The processing element 132 processes the scanner signal using the values obtained by consulting the adjustment table 128.

As illustrated here, the sensor 120 is used to obtain rotational position information, either to identify a reference position of the spinner 108 or simply to provide the rotational position of the spinner 108 relative to the reference position. If the sensor 120 is used to identify the reference position, the rotational position of the spinner 108 may be determined by using timing information provided by a clock module 134. The clock module 134 monitors the elapsed time since the spinner 108 was in the reference position and the position is then computed using a position computation module 136.

In addition, alternative techniques exist for determining a reference position of the spinner 108. For example, calibration of the position of the spinner 108 may be periodically performed. For example, a synchronization label 138 may be positioned within the scanner such that the synchronization label 138 will be scanned when the spinner is in a predefined position. The synchronization label 138 may suitably be positioned such that it is scanned once in each rotation of the spinner 108.

In addition to setting parameters used by the detection and decoding module 118 using the rotational position of the spinner 108, it is also possible to set parameters of other elements of the scanner 100. For example, the focal point of the laser beam 104 may be adjusted. A suitably designed scanner such as the scanner 100 can be adapted to use positional information to adjust any parameter that can improve scanning performance if adjusted for the position of the spinner 108.

FIG. 2A illustrates further details of the spinner 108 of the scanner 100 of FIG. 1. The spinner 200 is a six faceted spinner having facets 202A-202F. The facets 202A-202F are concave and separated by vertices 204A-204F. Because of the concavity of the facets 202A-202F, the vertices 204A-204F form relatively great angles between adjacent facets. Points close to a vertex but on opposite facets of the vertex are separated by a significant angle. For example, it can be seen that the angle between the points 206 and 208, separated by the vertex 204A, is relatively great.

FIG. 2B illustrates the spinner 108 in various rotational positions, showing reflected laser beams reflected from the spinner 108 at each of the illustrated rotational positions. The laser beam 104 is directed toward the spinner 108. The rotational positions 108, 108', 108" and 108''' illustrate positions of the spinner 108 as it undergoes a counterclockwise rotation, and the reflected laser beams 250, 250', 250" and 250''' are reflected from the spinner at the positions 108, 108', 108" and 108''', respectively. The maximum angular displacement of reflected laser beams reflected from the spinner 108 is approximately 240 degrees, compared to a maximum displacement of approximately 120 degrees achieved through the user of a hexagonal spinner having flat sides.

Figure 3:
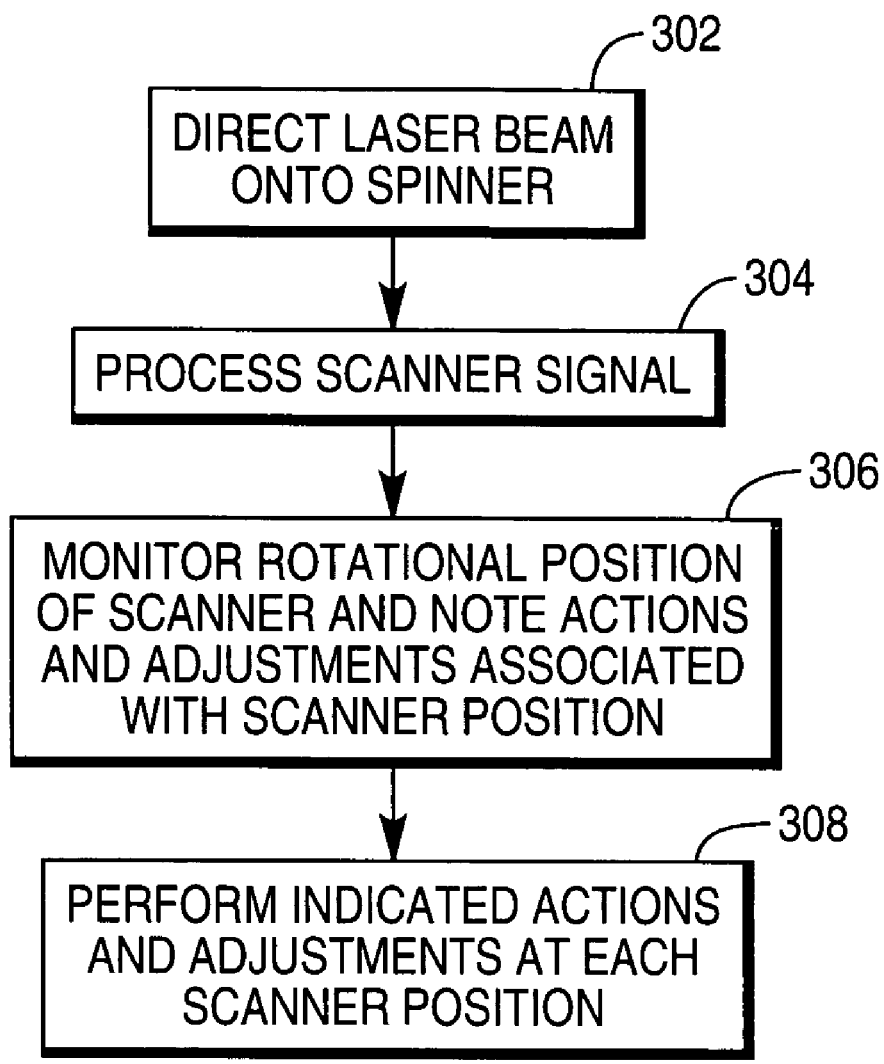
FIG. 3 illustrates a process of bar code scanning according to an aspect of the present invention.

FIG. 3 illustrates a process 300 of bar code scanning according to the present invention. At step 302, a laser beam is directed from a laser onto a rotating spinner. The spinner may suitably be a six faceted polygonal spinner with concave facets, similar to the spinner 108 of FIGS. 1 and 2. The spinner reflects the laser beam to the first of a sequence of fixed mirrors and the reflected laser beam is reflected from the first mirror to subsequent mirrors in the sequence to create a scan beam that is reflected from the last mirror in the sequence and out of a scan window. The motion of the spinner causes the laser beam to move across the fixed mirrors, causing the scan beam to trace across the scan window, creating a scan line. In addition, the motion of the spinner causes the laser beam to be reflected through different sequences of fixed mirrors so as to trace out a plurality of scan lines forming one or more scan patterns. At step 304, a scanner signal resulting from the entry of light into the scanner is continuously processed in order to detect and decode bar code information resulting from the reflection of light from a bar code within the field of view of the scanner.

At step 306, the rotational position of the spinner is continuously monitored and compared against a table showing adjustments to be made and actions to be taken at predetermined spinner positions. The adjustments take into account the effect of the position of the spinner on scanner performance. The effects include effects resulting from variations exhibited by the spinner, causing the properties of the area of the spinner in the path of the laser beam to change as the spinner rotates. The adjustments are chosen to improve the scanner performance at the designated spinner position and include adjustments to the intensity of the laser beam and adjustments in the processing of the light entering the scanner. At step 308, the indicated adjustments or actions are performed whenever the spinner reaches a position indicated in the table.

While the present invention is disclosed in the context of a presently preferred embodiment, it will be recognized that a wide variety of implementations may be employed by persons of ordinary skill in the art consistent with the above discussion and the claims which follow below.

I claim:

1. A bar code scanner comprising:
    a laser source for emitting a laser beam;
    a rotating spinner for reflecting the laser beam, the rotating spinner being placed and configured such that when the laser beam is reflected from the spinner and to and out of a scan window to form a scan beam, the rotation of the spinner will direct the laser beam such that the scan beam sweeps across the scan window to form a scan line, the rotating spinner having a plurality of concave facets, each concave facet having a curvature which varies along the facet's extent, such that variations in the facets cause variations in the laser beam;
    a spinner position module for computing a rotational position of the spinner; and
    a bar code detection and processing module for processing a scanner signal generated by light entering a scan window of the scanner, the bar code detection and processing module receiving rotational position information indicating the rotational position of the spinner and using the rotational position information to adjust parameters used in processing the scanner signal in order to adjust for variations caused by curvature variations in the facets of the spinner.

2. The scanner of claim 1, where the parameters that are adjusted using the rotational position information include adjusting a sampling rate for sampling the scanner signal in order to adjust for changes in the speed of the scan beam caused by the variations in the facets of the spinner.

3. The scanner of claim 1, further comprising a laser intensity adjustment circuit to adjust the intensity of the laser beam in order to compensate for changes in intensity of the scan beam caused by the curvature variations in the facets of the spinner.

4. The scanner of claim 1, wherein rotational position information used to compute adjustment information relating to adjustments required for each rotational position of the spinner at which an adjustment is required and wherein the adjustment information is stored in an adjustment table.

5. The scanner of claim 4, wherein information and adjustment information is computed by calibration of the scanner, calibration including examining a photodetector signal produced by reflections from an object having uniform reflective characteristics in order identify differences in the photodetector signal at different rotational positions of the spinner.

6. The scanner of claim 1, wherein the spinner position module determines the rotational position of the spinner by identifying a time when the spinner is in a reference position and using timing information to compute the displacement of the spinner from the reference position.

7. The scanner of claim 6, wherein the reference position of the spinner is determined by a sensor.

8. The scanner of claim 7, wherein the reference position of the spinner is determined by the reading of a synchronization label.

9. A method of bar code detection and decoding, comprising the steps of:

directing a laser beam from a laser onto a rotating spinner, the rotating spinner having a plurality of concave facets, each concave facet having a curvature which varies along the facet's extent, the rotating spinner reflecting the laser beam from the spinner to a sequence of mirrors to trace out a plurality of scan beams, each scan beam being traced across the scan window to form a scan line, each rotation of the spinner forming one or more scan patterns comprising a plurality of scan lines emerging from a scan window;

continuously processing a scanner signal resulting from the entry of light into the scanner in order to detect and decode bar code information resulting from the reflection of light from a bar code within the field of view of the scanner;

identifying adjustments to be made and actions to be taken at predetermined positions of the rotational spinner;

continuously monitoring the rotational position of the spinner;

whenever the spinner reaches a predetermined position at which an adjustment is to be made or an action is to be taken, making the adjustment or taking the action associated with the predetermined position; and whenever the scanner signal reflects the presence of a bar code in a scan field of the scanner, processing the signal to extract bar code information.

10. The method of claim 9, wherein the step of monitoring the rotational position of the spinner includes noting the time at which the spinner reaches a reference position and using timing information to identify the displacement of the spinner from the reference position.

11. The method of claim 10, wherein the actions to be taken include adjusting a sampling rate for sampling the scanner signal in order to adjust for changes in the speed of the scan beam caused by the curvature variations in the facets of the spinner.

12. The method of claim 11, wherein the actions to be taken include setting an intensity level of the laser beam, the power level being set based on the spinner position.

13. The method of claim 12, wherein the spinner is detected to be in the reference position by a sensor.

14. The method of claim 13, wherein the spinner is detected to be in the reference position by the reading of a synchronization label.

\* \* \* \* \*